UNITED STATES PATENT OFFICE.

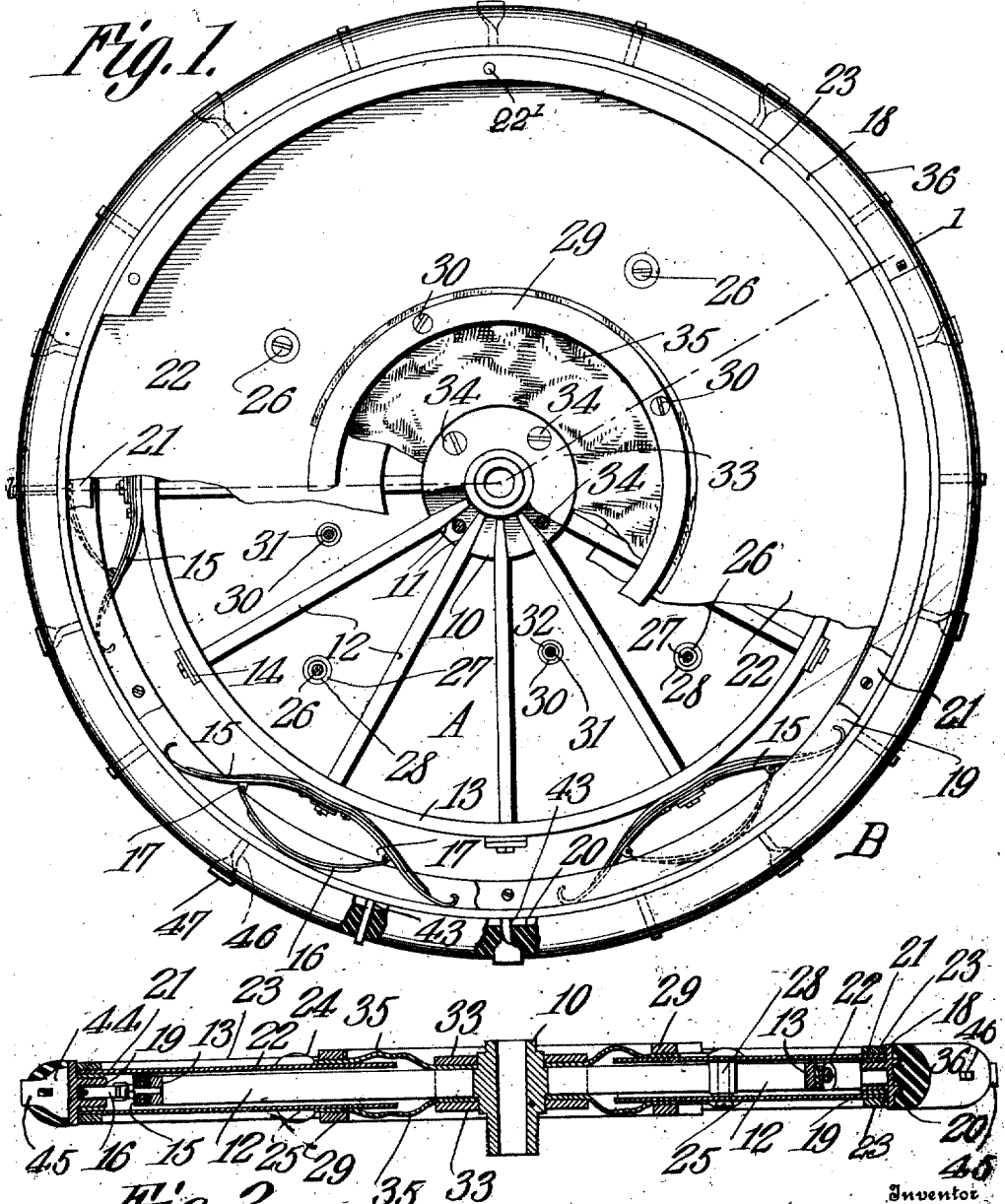

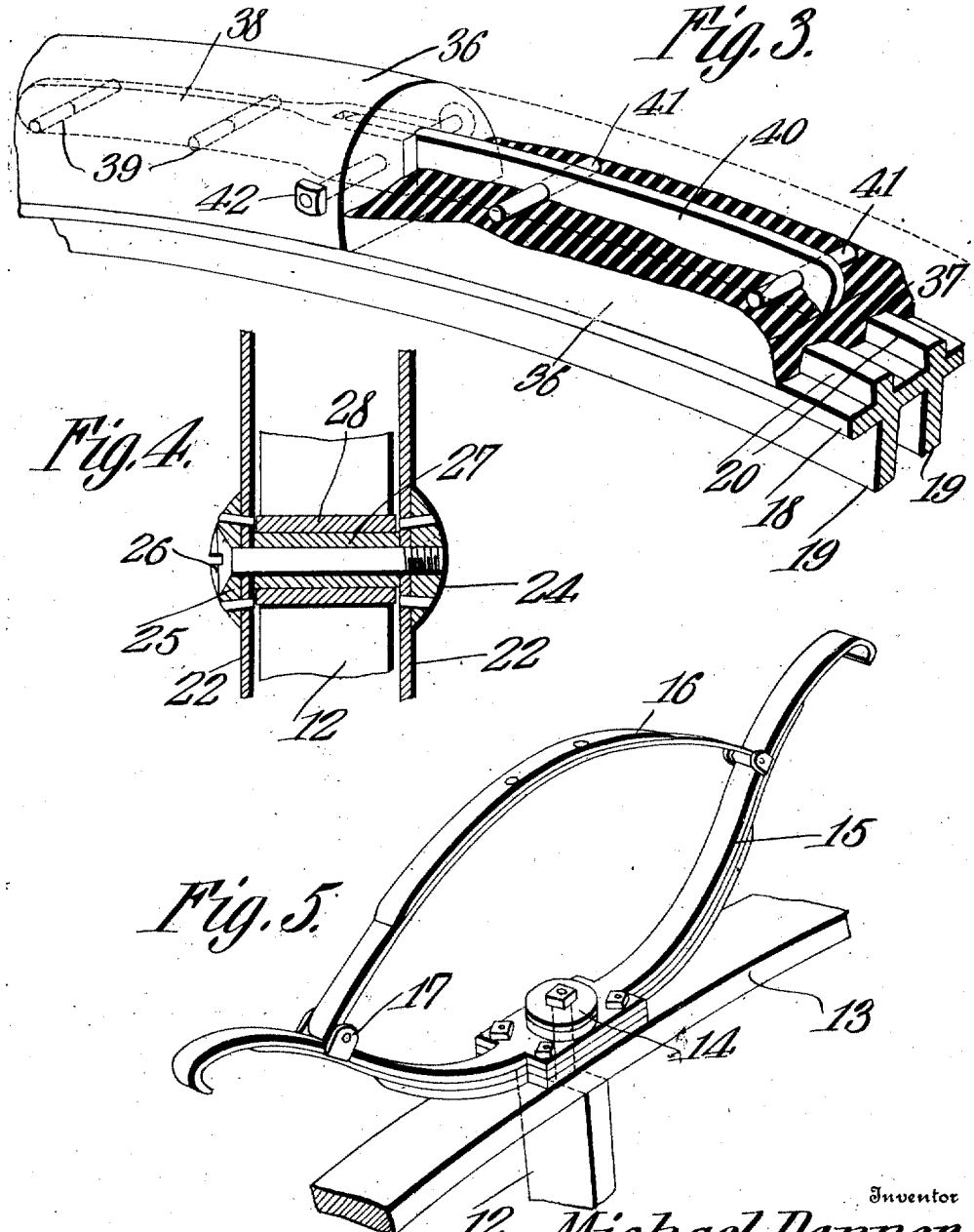

MICHAEL DANNER, OF PANOLA, ILLINOIS.

VEHICLE-WHEEL.

1,001,000.  Specification of Letters Patent.  Patented Aug. 22, 1911.

Application filed May 5, 1908. Serial No. 431,032.

*To all whom it may concern:*

Be it known that I, MICHAEL DANNER, a citizen of the United States, residing at Panola, in the county of Woodford and State of Illinois, have invented a new and useful Vehicle-Wheel, of which the following is a specification.

This invention relates to vehicle wheels, and more especially to that type of vehicle wheel wherein the rim portion is spaced from the center of the wheel and is supported in such spaced relation by means of suitable springs.

An object of the invention is to provide an improved form of such wheel, the two portions of which will be flexibly united.

Another object of the invention is to provide an improved means for protecting the interior or working parts of the wheel from dust, rain, mud, or other deleterious substances.

A third object of the invention is to provide an improved construction for the tire supporting or felly portion of the wheel.
With these and other objects in view, as will appear in the description of the device, the invention consists in certain novel arrangements of the supporting springs, certain new means of connecting the two portions of the wheel, and certain improvements in the construction of the dirt protector.

The invention further consists in certain novel arrangements of parts, and combinations of details hereinafter described, illustrated in the accompanying drawings, and specifically set forth in the claims.

In the accompanying drawings, like characters of reference refer to like parts in the several views, and Figure 1 is a side view of a wheel constructed in accordance with the invention, a portion being broken away to show the arrangement of the interior. Fig. 2 is a partial sectional view thereof, taken from the edge, the section being taken along the line 1—1 of Fig. 1. Fig. 3 is a perspective view of a portion of the rim showing the method of holding the tire thereon and the manner of fastening the ends of the tire together. Fig. 4 is a detail of one of the rollers in the intermediate or web portion of the wheel. Fig. 5 is a perspective detail of the arrangement of the interior rim and the springs carried thereon.
The wheel consists of two main portions, a center, as indicated by the letter A, and a rim or felly portion, as indicated by B. The central portion A consists of a hub 10 provided with a series of slots 11 radially arranged therein. Extending from the hub 10 are a series of spokes 12. These spokes are preferably rectangular in cross section and are of the same dimension substantially throughout their lengths. Upon the outer ends of the spokes 12 is carried a rim 13, being secured to the spokes 12 by means of suitable nuts and washers, as indicated at 14. Mounted upon the rim 13, preferably opposite alternate spokes, are springs 15. These springs are preferably of the kind known as leaf springs and are provided with a second spring of the same character, as indicated at 16. The springs 15 and 16 are connected together by means of a lug and pin shown at 17. The springs 15 are so arranged that their ends will extend beyond the spring 16, and when in position, the middle of the spring 16 and the ends of the springs 15 will be radially equidistant from the axis of the wheel.

The portion B of the device comprises a rim 18 having annular spaced ribs extending inwardly therefrom and annular spaced ribs extending outwardly therefrom, as indicated, respectively, at 19 and 20. On the outside of the ribs 19 is carried an annular ring 21 of rubber or other elastic material. Inwardly of the plane of this rubber ring there is further carried a plate 22. This plate is preferably metallic in character and extends circumferentially around the hub, being spaced therefrom. Annular metallic rings 23 are held outside of the plate 22, being coextensive with the elastic ring 21. These rings are secured to the ribs 19 by suitable screws or bolts 22' which pass through the elastic ring 21 and the plate 22. By this means, it will be noted that the plates 22 are securely attached to the rim 18. In order to properly space these plates at the inner portions thereof, and also to strengthen them at these portions, there are carried on the plates rigid bosses 24 and 25, the same being opposi ely disposed, as clearly shown in Fig. 4. T ese bosses are united by a bolt 26 whereon is carried a collar 27. The collar 27 is of such length as to properly space the plates 22. On the collar 27 is held a loose roller 28. The roller 28 is mounted on the collar in such manner as to freely rotate thereon, and is further free from the plates 22. Near the inner edges of the plates 22 are rings 29. These rings are secured to the plates by suitable bolts 30. These bolts 30 are provided with collars 31, and rollers 32 similar to those carried on the bolt 26. The bolts 26 and 30 are so spaced angularly with reference to each other that the rollers 28 and 32 will be held to contact each with a side of one of the spokes 12 when the two parts of the wheel are concentric. Hub plates 33 are held to the hub by means of bolts 34. Between the hub plates and the hub, and between the rings 29 and the plates 22 there is held a flat annular pair of closures 35. These closures are preferably made of rubber, leather, or the like material. It will be plain that by reason of this material being elastic, the wheel will have the two parts displaced with relation to each other, both eccentrically and circumferentially, without affecting the closures.

The ribs 19, previously referred to, are spaced in such manner as to form an annular channel interiorly of the rim 18. Within this channel extends the ends of the springs 15, and the central portion of the springs 16. These springs simply press against the rim 18 and are not in any way fixedly connected thereto. It is thus possible for the center of the wheel to rotate a short distance relatively to the felly portion. This rotation will be limited by rollers 28 and 32 extending between the spokes 12. In order to prevent violent contact of the rim and the rib 19 when the wheel moves eccentrically by a heavy load, one of the washers 14 is preferably made of some elastic material, such as rubber. Upon the rim 18 is carried a tire 36 provided with a pair of annular grooves 37 adapted to fit the annular ribs 20 of the rim 18. One end of the tire 36 is provided with an embedded yoke 38, the same being held from withdrawal by anchor bolts 39. The other end of the tire is provided with a similar embedded plate 40 having anchor bolts 41 thereon. The plate 40 and the yoke 38 are so arranged that when the tire is in position, the plate 40 will penetrate the yoke 38, as shown in Fig. 3, and a bolt 42 is attached to a suitable opening in the yoke and plate and secures them firmly together when in this position. In order to prevent the tire from slipping circumferentially on the rim 18, the ribs 20 are interrupted, as at 43. In the tire 36, and placed so as to coincide with the interrupted portions of the ribs, there are embedded plates 44 having their inner edges rectilinear. The plates 44 project from the tire, as at 45, and thus afford a positive means for engaging the ground. Similar plates 46 are also spaced around the tire and the projecting portion is twisted at right angles to the body of the plate. By this means, there is provided an anti-skidding device.

It is desired to call attention to the fact that when the wheel is about to be put in motion, the springs 15 and 16 will, by their frictional contact with the rim 18, cause the rollers to pass from one of the spokes to the other at a relatively slow rate of speed, thus preventing any shock and breakage.

I claim:—

1. In a vehicle wheel, a central member provided with spokes, a circumferential portion free from and in spaced relation to said central member, elements on said circumferential portion arranged to contact with the spokes to rotate said portion as the central member rotates, and springs carried by the central member and having non-restricted sliding contact with said circumferential portion, each of said springs comprising a major bow secured to the said central member at a point between its ends and having its ends bearing against the said circumferential portion, and a minor bow pivoted at its ends to the major bow at points between the point of attachment of the major bow to the central member and the ends thereof, the said minor bow bearing against the said circumferential portion at a point between its pivoted ends.

2. In a vehicle wheel, a central member provided with spokes, a circumferential portion free from and in spaced relation to said central member, elements on said circumferential portion arranged to contact with said spokes whereby to rotate said portion as the central member rotates, and cushion elements interposed between the central member and the circumferential portion, each of said cushion elements comprising a major bow spring formed with an opening between its ends, one of the spokes having a threaded stud projecting through the opening, and through the said central member, a nut threaded upon the stud and securing the spring against the said central member, securing elements secured through the spring at points at each side of the opening in the spring, and through the said central member, the ends of the major bow spring bearing against the circumferential portion and having free sliding movement thereover, and a minor bow spring pivoted at its ends to the major bow spring inwardly of the ends thereof and bearing at its intermediate portion against the said circumferential portion.

In testimony that I claim the foregoing as my own, I have hereto affixed my signature in the presence of two witnesses.

MICHAEL DANNER.

Witnesses:
J. A. MINGEN,
S. R. OGLE.